June 13, 1961  A. HIRSCH  2,988,697
LINEAR SELSYN OR SYNCRO-TRANSMITTER
Filed Jan. 6, 1960  2 Sheets-Sheet 1
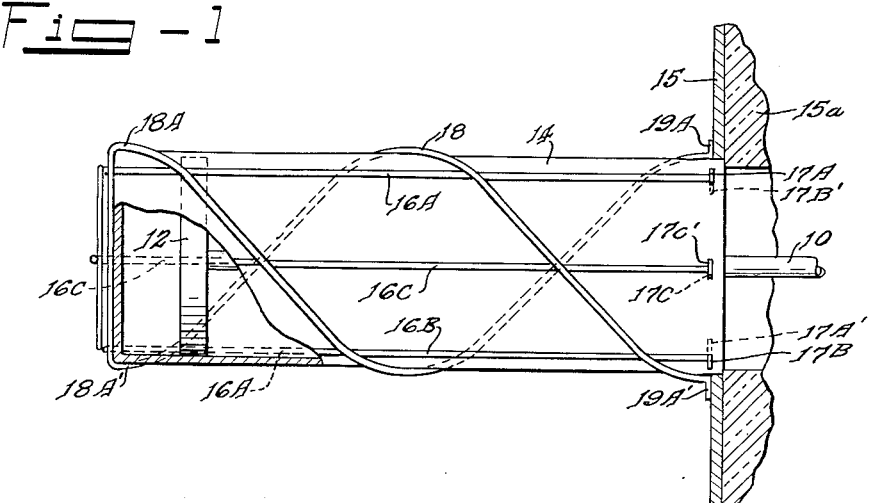
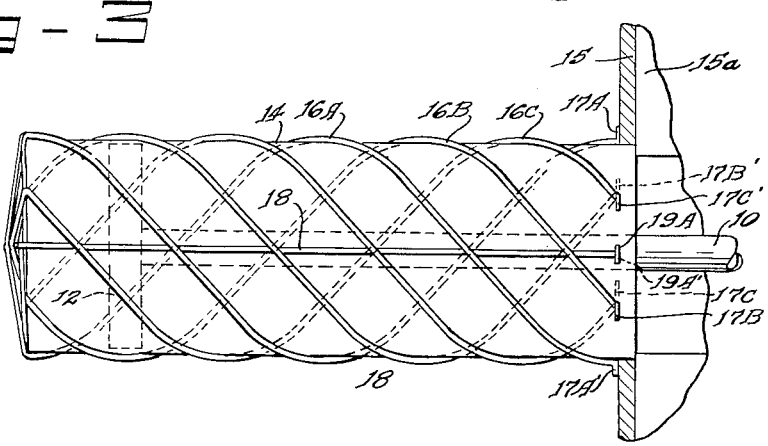
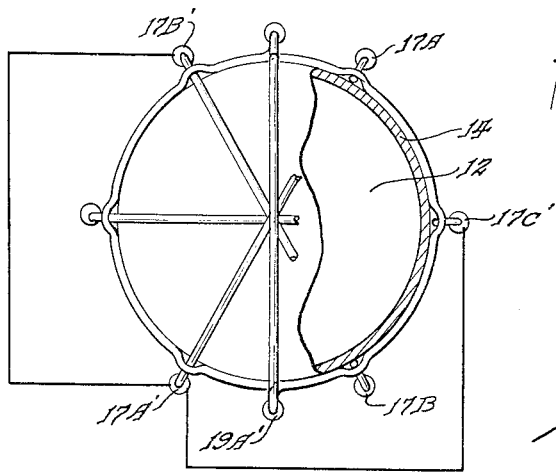
INVENTOR.
Albert Hirsch
BY
Attorney

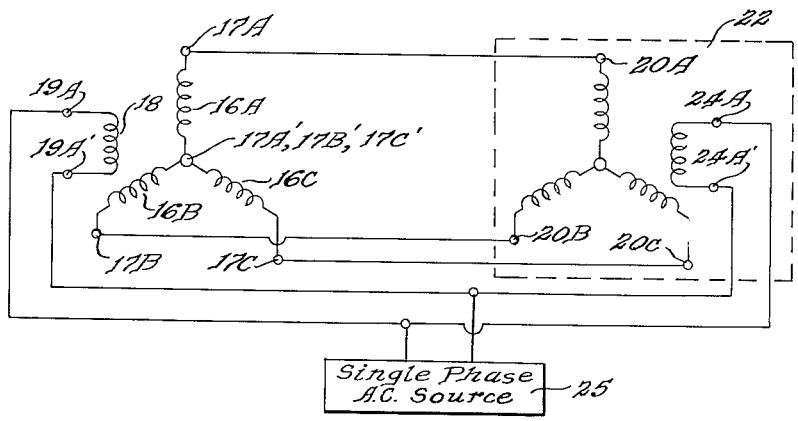
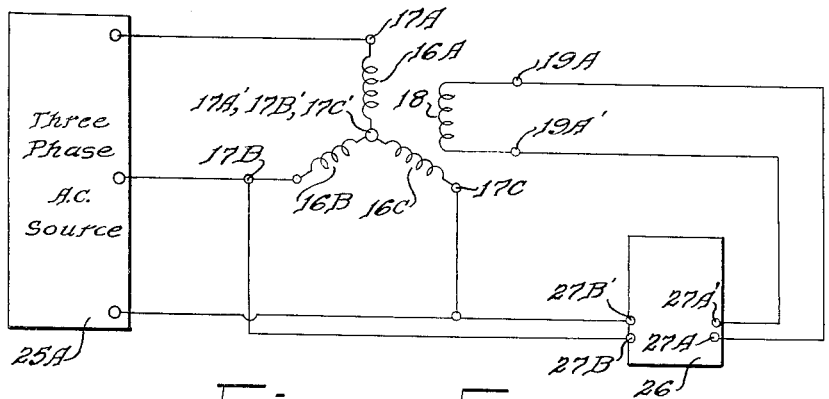
INVENTOR.
*Albert Hirsch*
BY
*Roland A. Anderson*
*Attorney*

United States Patent Office 2,988,697
Patented June 13, 1961

2,988,697
LINEAR SELSYN OR SYNCRO-TRANSMITTER
Albert Hirsch, Evergreen Park, Ill., assignor to the United States of America as represented by the United States Atomic Energy Commission
Filed Jan. 6, 1960, Ser. No. 916
9 Claims. (Cl. 324—86)

This invention relates to position indicators and more specifically to electromagnetic position indicators for indicating the position of members movable axially within closed tubes.

The most common type of electromagnetic position indicator is a selsyn or self-synchronous electric device. The selsyn principally comprises a rotor having a coil wound thereon and a stator consisting of three separate windings. When a single-phase A.C. voltage is applied to the rotor coil of a conventional selsyn, a voltage is induced in each stator winding having a magnitude and phase dependent upon the angular position of the rotor coil relative to the stator windings. These voltages thus transmit the angular position of the rotor with respect to some predetermined reference point.

Various adaptations of the conventional selsyn have been developed to provide the transmittal of linear motion. C. E. Keene, in his device described in U.S. Patent 2,848,632, spiralled the coil of the rotor and maintained the stator windings parallel to the axis of the rotor. Thus, as the spirally wound rotor with a single-phase A.C. source applied to the coil is moved linearly with respect to the stator, a voltage is induced in each stator winding having a magnitude and phase dependent upon the linear position of the spirally wound rotor.

In the field of nuclear reactors, positional data are sometimes required of the linear movement of control rods housed in sealed unperforated tubes. The previously known adaptations of the conventional selsyn would require perforation of the tube to obtain positional data of the movable member therein; hence, they are unsatisfactory.

It is therefore an object of this invention to provide an electromagnetic position indicator to indicate the position of a member movable axially within a closed tube without perforating the tube.

It is another object of this invention to provide an electromagnetic position indicator to indicate the position of a control rod movable axially within a sealed tube of a pressure vessel in a nuclear reactor.

Other objects will become apparent as the detailed description proceeds.

In general, this invention incorporates a magnetic core fixed to an axially translatable member within a closed tube, said magnetic core being short relative to said member, a coil and windings extending axially outside said closed tube, and having a total uniform circumferential progression of 360 mechanical degrees or a multiple thereof relative to one another as they extend along said tube, said coil and winding being electrically excited whereby axial movement of said magnetic core induces voltages having magnitudes or phase angles proportional to the axial position of said magnetic core within said closed tube, and means for reading said magnitudes or phase angles of said voltages.

More complete understanding of the invention will best be obtained from consideration of the accompanying drawings, in which:

FIG. 1 is a side view of the preferred embodiment of the present invention;

FIG. 2 is an end view of the embodiment illustrated in FIG. 1;

FIG. 3 is a side view of a second embodiment of the present invention;

FIG. 4 is an electrical schematic illustrating a means for readout of the present invention using a selsyn receiver; and FIG. 5 is an electrical schematic illustrating a means for readout of the present invention using a phasemeter.

Referring to the construction of the electromagnetic position indicator as shown in FIGS. 1 and 2, a nuclear reactor control element extension 10 and a disc-shaped magnetic core 12 attached thereto are enclosed within a closed cylindrical tube 14 sealed to the pressure vessel 15 enclosing the reactor active portion 15a. The control element extension 10 is free to move linearly within the tube 14. The magnetic core 12 is short relative to the length of the control element extension 10 within the tube 14. Three windings 16A, 16B and 16C extend the length of the tube 14 and are wound parallel to the axis of the tube 14. The windings 16A, 16B and 16C are each associated with two terminals 17A, and 17A', 17B and 17B', and 17C and 17C', respectively. The windings are displaced 120 electrical degrees from each other and are Y connected by interconnecting terminals 17A', 17B' and 17C', as shown. The windings may also be, for the purpose of this invention, delta connected by connecting terminals 17A' to 17B, 17B' to 17C, and 17C' to 17A. Also around the tube 14 is wound a coil 18 having terminals 19A and 19A'. Said coil 18 is wound in a helix having a uniform circumferential progression through 360 mechanical degrees extending the length of tube 14. It is to be understood that coil 18 of FIGS. 1 and 2 may be wound in a helix having a uniform circumferential progression through any multiple of 360 mechanical degrees extending the length of tube 14.

FIG. 3 depicts the same basic electromganetic position indicator as in FIGS. 1 and 2 except for the disposition of coil 18 and the windings 16A, 16B, and 16C of FIGS. 1 and 2. For similar parts in both embodiments the same reference numbers are used. In FIG. 3, the three windings 16A, 16B, and 16C extend the length of the tube 14 and are each wound around the tube 14 in a helix having a uniform circumferential progression through 360 mechanical degrees. It is to be understood that windings 16A, 16B and 16C of FIG. 3 may be wound in a helix having a uniform circumferential progression through any multiple of 360 mechanical degrees extending the length of tube 14. The windings 16A, 16B, and 16C and their associated terminals 17A and 17A', 17B and 17B', and 17C and 17C' are displaced 120 electrical degrees from each other and are Y connected by connecting terminals 17A', 17B', and 17C', as shown. The windings may also be delta connected, for the purposes of this invention, by connecting terminals 17A' to 17B, 17B' to 17C, and 17C' to 17A. The coil 18 is wound around the tube 14 parallel to the axis thereof and extends the length of the tube 14.

FIG. 4 depicts one means by which lineal position readout of the electromagnetic position indicators shown in FIGS. 1 and 2, and 3 may be accomplished. In FIG. 4, the terminals 17A, 17B, and 17C are respectively connected to the stator winding terminals 20A, 20B, and 20C of a conventional selsyn receiver 22. The terminals 19A and 19A' of the coil 18 are connected to the rotor coil terminals 24A and 24A', respectively, of the selsyn receiver 22, and both of these coils are energized by the same single-phase A.C. source 25.

Reference is now made to the operation of the device as shown in FIGS. 1, 2, and 3, with electrical connections as in FIG. 4. As the control element extension 10 and its associated magnetic core 12 are moved linearly within the closed tube 14, voltages will be induced in the three windings 16A, 16B, and 16C from the coil 18 having magnitudes and phase dependent upon the linear position of the magnetic core 12. These voltages, when impressed on the stator windings of the selsyn receiver 22, cause the rotor coil of the selsyn receiver 22 to correspondingly align itself, and thereby indicate the position of the magnetic core.

In FIG. 5, a three-phase A.C. source 25A is applied to the terminals 17A, 17B, and 17C. A phasemeter 26 has one set of input terminals 27A and 27A' connected to the coil terminals 19A and 19A' and another set of terminals 26B and 26B' connected across one phase of the three-phase source.

Reference is now made to the operation of the device as shown in FIGS. 1, 2, and 3, with electrical connections as in FIG. 5. The applied three-phase A.C. source 25A sets up a rotating magnetic field in the three windings 16A, 16B, and 16C. As the control element extension 10 and its associated magnetic core 12 are moved linearly in closed tube 14, voltages are induced in the coil 18 having magnitudes and phase proportional to the linear position of the magnetic core 12. The phasemeter 26 is adapted to read the position of the magnetic core 12 by comparing the relative phase angles of the induced voltages in coil 18 and one preselected phase of the three-phase A.C. source 25A.

Persons skilled in the art will, of course, readily adapt the general teachings of the invention to embodiments other than the specific embodiments illustrated. Accordingly the scope of the protection afforded the invention should not be limited to the particular embodiments shown in the drawings and described above, but shall be determined only in accordance with the appended claims.

What is claimed is:

1. In a position indicator for indicating the position of a member movable axially within a closed tube, said member having a short magnetic core relative to the length thereof, in combination, a plurality of electrically connected parallel windings electrically equispaced around the circumference of said tube and extending axially thereof, and a coil also outside of said tube and extending axially thereof substantially coextensive with said windings, said coil and said windings having a total uniform circumferential progression of 360 mechanical degrees or a multiple thereof relative to one another as they extend along said tube.

2. The structure according to claim 1, wherein said parallel windings are parallel to said tube and said coil spirals around said tube.

3. The structure according to claim 1, wherein said coil is parallel to said tube and said parallel windings spiral around said tube.

4. In a position indicator for indicating the position of a member movable axially within a closed tube, said member having a short magnetic core relative to the length thereof, in combination, three windings longitudinally surrounding said tube parallel to the axis thereof and electrically displaced 120 degrees from each other, said windings having a common connection at one end, and a coil disposed around said tube in a helix having a uniform circumferential progression through 360 mechanical degrees or a multiple thereof extending the length of said three windings.

5. The structure, according to claim 4, further including a single-phase A.C. source connected to said coil, and a selsyn receiver having a stator connected to the other ends of said three windings and a rotor connected to said single-phase A.C. source and calibrated to indicate the position of said magnetic core within said closed tube.

6. The structure, according to claim 4, further including a three-phase A.C. source connected to the other ends of said three windings, and a phasemeter connected across said coil and one phase of said source, said phasemeter being adapted to indicate the relative phase between the excited current in said coil and the exciting current in said three windings, which relative phase is a function of the position of said magnetic core within said closed tube.

7. In a position indicator for indicating the position of a member movable axially within a closed tube, said member having a short magnetic core relative to the length thereof, in combination, a coil longitudinally surrounding said tube and parallel to the axis thereof, and three windings electrically displaced 120 degrees from each other, each of said windings being disposed around said tube in a helix having a uniform circumferential progression through 360 mechanical degrees or a multiple thereof extending the length of said coil and having a common connection at one end.

8. The structure, according to claim 7 further including a single-phase A.C. source connected to said coil, and a selsyn receiver having a stator connected to the other ends of said three windings and a rotor connected to said single-phase A.C. source and calibrated to indicate the position of the magnetic core within said closed tube.

9. The structure, according to claim 7, further including a three-phase A.C. source connected to the other ends of said three windings, and a phasemeter connected across said coil and a phase of said source, said phasemeter being adapted to indicate the relative phase between the excited current in said coil and the exciting current in said three windings, which relative phase is a function of the position of said magnetic core within said closed tube.

References Cited in the file of this patent

UNITED STATES PATENTS

| | | |
|---|---|---|
| 2,150,377 | Keinath | Mar. 14, 1939 |
| 2,414,318 | Middel | Jan. 14, 1947 |
| 2,441,869 | Childs | May 18, 1948 |
| 2,452,862 | Neff | Nov. 2, 1948 |
| 2,848,632 | Keene | Aug. 19, 1958 |